United States Patent
Iizuka et al.

(10) Patent No.: US 12,304,581 B2
(45) Date of Patent: May 20, 2025

(54) SADDLE-RIDING VEHICLE

(71) Applicant: HONDA MOTOR CO., LTD., Tokyo (JP)

(72) Inventors: Chikashi Iizuka, Tokyo (JP); Kineo Tomura, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 689 days.

(21) Appl. No.: 17/641,448

(22) PCT Filed: Sep. 24, 2020

(86) PCT No.: PCT/JP2020/035938
§ 371 (c)(1),
(2) Date: Mar. 9, 2022

(87) PCT Pub. No.: WO2021/065649
PCT Pub. Date: Apr. 8, 2021

(65) Prior Publication Data
US 2022/0371676 A1    Nov. 24, 2022

(30) Foreign Application Priority Data
Sep. 30, 2019 (JP) .................................. 2019-179012

(51) Int. Cl.
*B62H 5/02* (2006.01)
*B62H 1/02* (2006.01)
(Continued)

(52) U.S. Cl.
CPC ................. *B62H 5/02* (2013.01); *B62H 1/02* (2013.01); *B62K 21/02* (2013.01); *B62K 21/12* (2013.01); *B62J 45/41* (2020.02)

(58) Field of Classification Search
CPC ... B62H 5/02; B62H 1/02; B62H 5/04; B62K 21/02; B62K 21/12; B62K 21/00; B62K 21/18; B62J 45/41
See application file for complete search history.

(56) References Cited

U.S. PATENT DOCUMENTS 6,237,710 B1 * 5/2001 Mori ........................ B62H 5/00
                                                     180/219
11,858,485 B2 * 1/2024 Kakimoto ............. B60T 13/686
(Continued)

FOREIGN PATENT DOCUMENTS

DE    102008008521    8/2008
DE    102008013487    9/2009
(Continued)

OTHER PUBLICATIONS

German Office Action for German Patent Application No. 112020004674.5 mailed Mar. 30, 2023.
(Continued)

*Primary Examiner* — James A English
*Assistant Examiner* — Marlon A Arce
(74) *Attorney, Agent, or Firm* — Amin, Turocy & Watson, LLP

(57) ABSTRACT

A saddle-riding vehicle includes a front wheel suspension device which supports a steering wheel (front wheel) and a steering handle (bar handle 4), a chassis frame which supports the front wheel suspension device to be steerable, a handle lock mechanism 60 which locks the steering of the front wheel suspension device with respect to the chassis frame at a predetermined handle lock position P1, a steering actuator 43 which applies an assist torque to the front wheel suspension device, and a control device 23 which controls the driving of the steering actuator 43. The control device 23 operates the steering actuator 43 so that the front wheel
(Continued)

suspension device is turned to the handle lock position P1 when detecting a predetermined lock standby state.

6 Claims, 7 Drawing Sheets

(51) Int. Cl.
    *B62K 21/02*     (2006.01)
    *B62K 21/12*     (2006.01)
    *B62J 45/41*     (2020.01)

(56) References Cited

U.S. PATENT DOCUMENTS

| | | |
|---|---|---|
| 2008/0156050 A1 | 7/2008 | Konno et al. |
| 2008/0191448 A1 | 8/2008 | Suzuki et al. |
| 2011/0190983 A1 | 8/2011 | Monig et al. |
| 2014/0284899 A1 | 9/2014 | Takenaka |
| 2016/0221601 A1* | 8/2016 | Barthomeuf ......... B62D 5/0469 |
| 2017/0008421 A1 | 1/2017 | Koizumi |
| 2018/0178871 A1* | 6/2018 | Ito ........................... B62H 5/02 |
| 2018/0244329 A1 | 8/2018 | Mori |
| 2020/0247491 A1* | 8/2020 | Kuramochi ............... B62J 43/30 |
| 2020/0247494 A1* | 8/2020 | Ichikawa ................. B62J 11/19 |
| 2022/0371676 A1* | 11/2022 | Iizuka et al. ........... B62K 21/02 |

FOREIGN PATENT DOCUMENTS

| | | |
|---|---|---|
| DE | 102016008304 | 1/2017 |
| JP | 2011-514865 | 5/2011 |
| JP | 2011-106166 | 6/2011 |
| JP | 2014-113865 | 6/2014 |
| JP | 2014-184934 | 10/2014 |
| JP | 2017-149327 | 8/2017 |
| JP | 2019-011016 | 1/2019 |
| JP | 2019-081483 | 5/2019 |

OTHER PUBLICATIONS

International Search Report and Written Opinion for International Application No. PCT/JP2020/035938 mailed on Dec. 15, 2020, 10 pages.

* cited by examiner

SADDLE-RIDING VEHICLE

TECHNICAL FIELD

The present invention relates to a saddle-riding vehicle.

BACKGROUND ART

Patent Document 1 (Japanese Unexamined Patent Application No. 2019-81483) discloses that a lock pin is projected by a lock mechanism operated by an actuator and an operation command of the actuator is given by wireless communication.

SUMMARY OF INVENTION

Technical Problem

In the above-described conventional technique, the actuator can be operated by wireless communication, but further improvement of convenience in the entire handle lock operation is examined.

An aspect of the present invention is to provide a saddle-riding vehicle capable of improving convenience at the time of a handle lock operation.

Solution to Problem (1) A saddle-riding vehicle according to an aspect of the present invention is a saddle-riding vehicle including: a suspension device which supports a steering wheel and a steering handle; a chassis frame which supports the suspension device to be steerable; a handle lock mechanism which locks the steering of the suspension device with respect to the chassis frame at a predetermined handle lock position; a steering actuator which applies an assist torque to the suspension device; and a controller for controlling the driving of the steering actuator, wherein the controller performs handle lock control of operating the steering actuator so that the suspension device is turned to the handle lock position when detecting a predetermined lock standby state.

(2) In the aspect (1), the saddle-riding vehicle may further include a stand which supports a chassis in an upright state and the lock standby state may be a state in which a predetermined handle lock request operation is performed while the chassis is supported by the stand.

(3) In the aspect (2), the handle lock request operation may be a predetermined lock operation for at least one of a switch provided on the vehicle and a wireless device separated from the vehicle.

(4) In the aspect (2) or (3), the stand may include a side stand which supports the chassis in an upright posture inclined toward one of the left and right sides and the suspension device may be turned to the side stand to reach the handle lock position.

(5) In any one of the aspects (1) to (4), the handle lock mechanism may include a handle lock actuator and the controller may perform the handle lock control of operating the handle lock actuator to a lock state of automatically locking the steering of the suspension device after the suspension device is turned to the handle lock position.

(6) In the aspect (5), the controller may cancel the handle lock control when the suspension device is not fully turned to the handle lock position within a specified time or the handle lock actuator is not fully operated to a lock state within a specified time.

Advantageous Effects of Invention

According to the aspect (1), since the steering actuator automatically steers the suspension device to the handle lock position when performing the handle lock of the saddle-riding vehicle, the steering operation of the suspension device is omitted. Therefore, the entire handle lock operation can be simplified and convenience can be improved.

According to the aspect (2), since the suspension device is automatically turned to the handle lock position while the chassis is supported in an upright state using the stand, the chassis is reliably supported by the stand when the suspension device is automatically turned. Therefore, convenience can be improved.

According to the aspect (3), since the suspension device can be turned by a lock operation of at least one of the switch on the vehicle and the wireless device separated from the vehicle, convenience can be improved.

According to the aspect (4), since the suspension device is turned toward the side stand to reach the handle lock position, the chassis is not inclined toward the side stand when the suspension device is automatically turned. Therefore, it is possible to stabilize the inclined posture of the chassis even when the suspension device is automatically turned to the handle lock position.

According to the aspect (5), since the steering of the suspension device and the handle lock are automatically performed from the lock standby state, convenience can be further improved.

According to the aspect (6), the protection of the handle lock device and the periphery of the vehicle can be improved by canceling the handle lock control in consideration of a case causing an event that hinders a series of operations from the steering of the suspension device to the handle lock (for example, interference between an obstacle in the periphery of the vehicle and the suspension device) when the handle lock is not completed even after the specified time elapses.

DESCRIPTION OF EMBODIMENTS

Hereinafter, an embodiment of the present invention will be described with reference to the drawings. The directions of the front, rear, left, right, and the like in the following description are the same as those in the vehicle described below unless otherwise specified. Further, an arrow FR indicating the front side of the vehicle, an arrow LH indicating the left side of the vehicle, an arrow UP indicating the upper side of the vehicle, and a line CL indicating the center of the left and right sides of the chassis are shown in the appropriate place in the figure used in the following description.

<Overall Vehicle>

Figure 1:
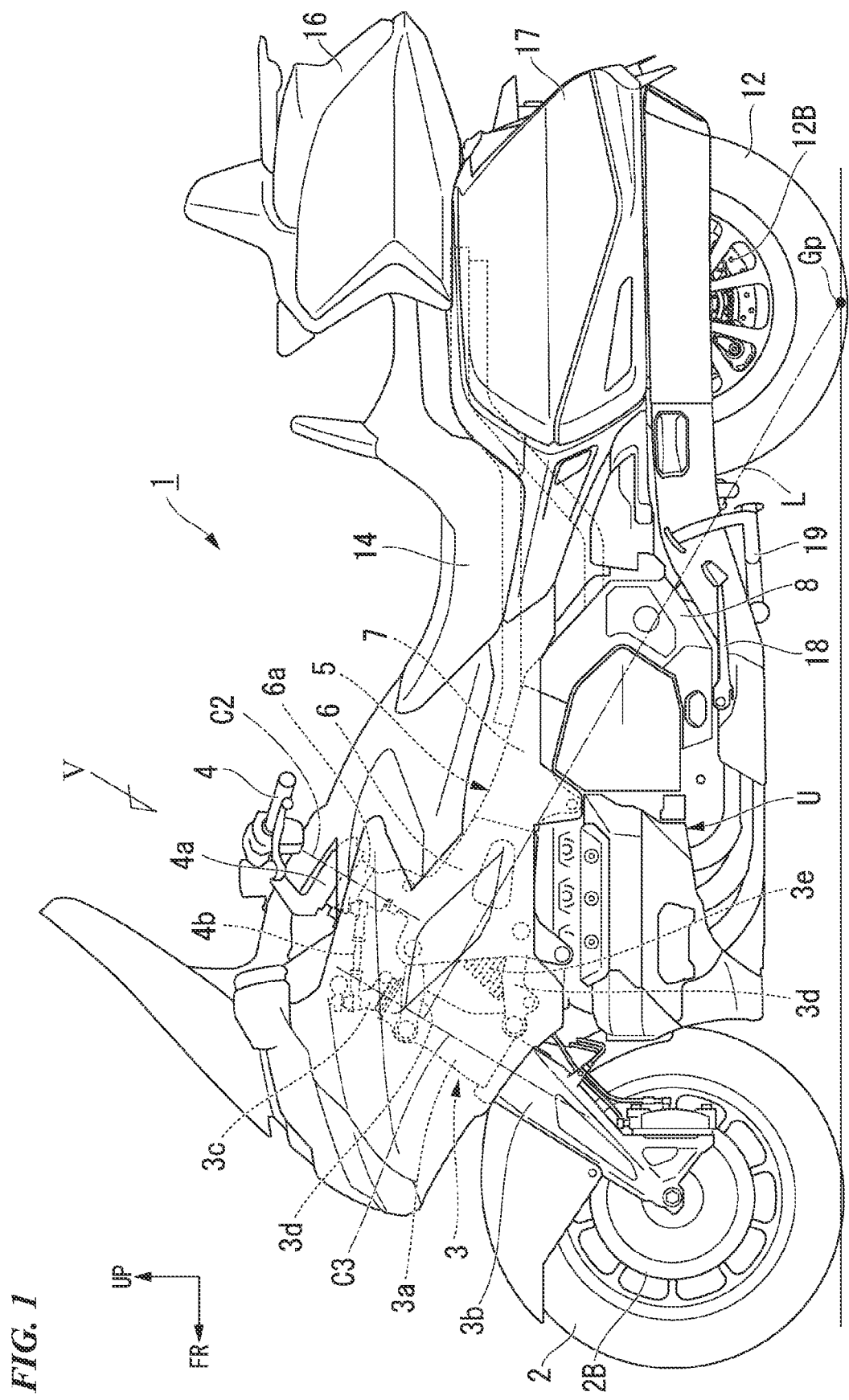
FIG. 1 is a left side view of a motorcycle of an embodiment of the present invention.

As shown in FIG. 1, this embodiment is applied to a motorcycle (saddle-riding vehicle) 1 equipped with a large cowling. A front wheel 2 of the motorcycle 1 is supported by a front wheel suspension device 3. The front wheel suspension device 3 is supported by a front-end portion of a chassis frame 5. The front-end portion of the chassis frame 5 is provided with a front block 6 which supports the front wheel suspension device 3. A front wheel steering bar handle 4 is attached to the upper portion of the front block 6. The bar handle 4 includes a pair of left and right grips gripped by a rider (driver) J.

A pair of left and right main frames 7 extends diagonally downward and rearward behind the front block 6. The rear end portions of the left and right main frames 7 are respectively connected to the upper end portions of a pair of left and right pivot frames 8. For example, a power unit U including a horizontally opposed 6-cylinder engine is mounted below the left and right main frames 7 and in front of the left and right pivot frames 8.

A front-end portion of a swing arm 11 is supported by the left and right pivot frames 8. A rear wheel 12 of the motorcycle 1 is supported by the rear end portion of the swing arm 11. A rear cushion (not shown) is provided between the front portion of the swing arm 11 and the longitudinal center portion of the chassis frame 5.

A front-end portion of a rear frame 9 is connected to the rear portions of the left and right pivot frames 8. A seat 14 for seating an occupant is disposed above the rear frame 9. A fuel tank 15 is disposed below the seat 14. A rear trunk 16 is disposed behind the seat 14. Left and right saddle bags 17 are respectively arranged on both left and right sides below the rear trunk 16. A side stand 18 which supports the chassis to stand in an upright posture inclined toward the left side is storably supported in the vicinity of the lower end of the left pivot frame 8. A main stand 19 which supports the chassis in an upright posture is storably supported in the vicinity of the lower ends of the left and right pivot frames 8.

The motorcycle 1 includes a front wheel brake 2B which brakes the front wheel 2 and a rear wheel brake 12B which brakes the rear wheel 12. The front and rear brakes 2B and 12B are respectively hydraulic disc brakes. The motorcycle 1 includes a brake actuator 42 (see FIG. 5) which supplies and discharges a hydraulic pressure to the front and rear brakes 2B and 12B. The motorcycle 1 constitutes a by-wire type brake system in which the front and rear brakes 2B and 12B and brake operators such as a brake lever and a brake pedal operated by the rider J are electrically linked.

<Front Wheel Suspension Device>

The front wheel suspension device 3 includes a handle support portion 6a, a handle post 4a, a head pipe 3a, a front fork member 3b, a steering member 3c, a link member 4b, a swing arm 3d, and a cushion unit 3e. The handle support portion 6a is provided at the upper end portion of the front block 6. The handle post 4a is rotatably supported by the handle support portion 6a. The head pipe 3a is provided separately from the chassis frame 5. The front fork member 3b is rotatably supported by the head pipe 3a. The steering member 3c is attached to the upper end portion of the front fork member 3b to be rotatable together. The link member 4b connects the steering member 3c and the handle post 4a. The swing arm 3d is connected to the front block 6 so that the head pipe 3a is swingable. The cushion unit 3e is interposed between the front fork member 3b and the front block 6.

The front fork member 3b supports the front wheel 2 at the lower end portions of the left and right forks. A steering shaft is integrally provided in the upper end portion of the front fork member 3b and the steering shaft is supported while being inserted through the head pipe 3a. The upper end portion of the steering shaft protrudes above the head pipe 3a and the steering member 3c is attached to the upper end portion.

Hereinafter, the rotation center axis of the handle post 4a with respect to the handle support portion 6a is referred to as a handle rotation axis C2. The rotation center axis of the front fork member 3b with respect to the head pipe 3a is referred to as a steering axis C3. The steering axis C3 is offset (separated) forward from the handle rotation axis C2. The steering axis C3 and the handle rotation axis C2 are substantially parallel to each other in the 1G state of the vehicle.

Figure 5:
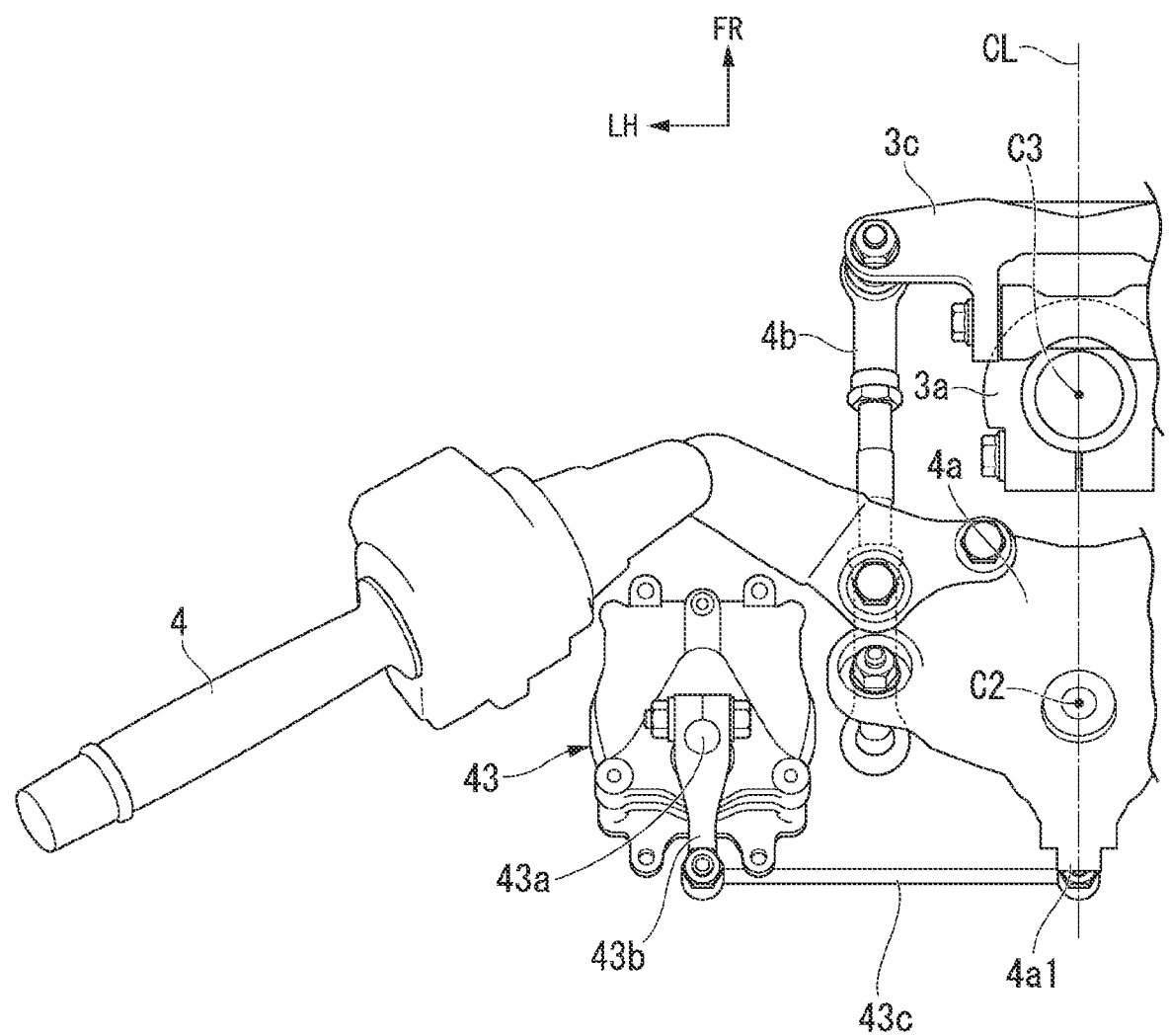
FIG. 5 is a perspective view as viewed from a direction of an arrow V in FIG. 1.

FIG. 5 is a perspective view as viewed from the direction of an arrow V along the steering axis C3 and the handle rotation axis C2 of FIG. 1. In FIG. 5, the link member 4b forms a parallel link together with the steering member 3c and the handle post 4a. Accordingly, the steering angle of the bar handle 4 is the same as the steered angle of the front wheel 2.

Referring to FIG. 1, the front-end portion of the swing arm 3d is supported by the head pipe 3a to be swingable upward and downward and the rear end portion thereof is supported by the front block 6 to be swingable upward and downward. The swing arm 3d includes a pair of upper and lower arm members. The swing arm 3d allows the head pipe 3a to move upward and downward in a predetermined trajectory. For example, the lower end portion of the cushion unit 3e is connected to the lower arm member.

The front wheel suspension device swings the swing arm 3d upward and swings the front fork member 3b and the head pipe 3a upward. At this time, the lower arm member moves the lower end portion of the cushion unit 3e upward to compress the cushion unit 3e.

The front wheel suspension device swings the swing arm 3d downward and moves the front fork member 3b and the head pipe 3a downward. At this time, the lower arm member moves the lower end portion of the cushion unit 3e downward to extend the cushion unit 3e.

<Control Device>

Figure 2:
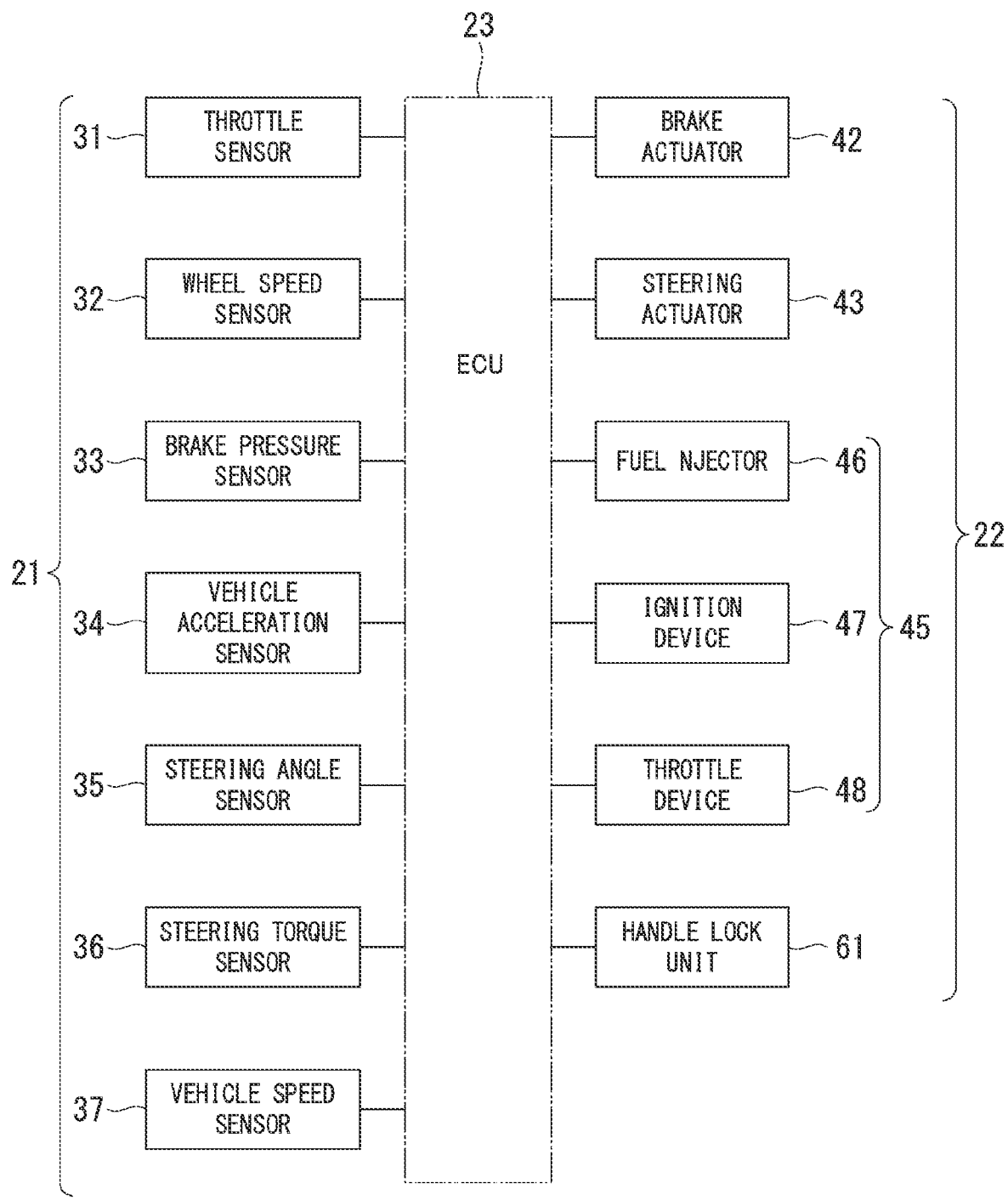
FIG. 2 is a configuration diagram of a control device of the motorcycle.

FIG. 2 is a configuration diagram of a control device 23 of the motorcycle 1 of this embodiment.

The motorcycle 1 includes the control device 23 which controls the operation of various devices 22 based on the detection information acquired from various sensors 21. The control device 23 is configured as, for example, an integrated or a plurality of electronic control units (ECUs). At least part of the control device 23 may be realized by the cooperation of software and hardware. The control device 23 includes a fuel injection control unit, an ignition control unit, and a throttle control unit that control the operation of an engine 10. The motorcycle 1 constitutes a by-wire type engine control system in which an engine auxiliary device such as a throttle device 48 and an accelerator operator such as an accelerator grip operated by the rider J are electrically linked.

The various sensors 21 include a chassis acceleration sensor 34, a steering angle sensor 35, a steering torque sensor 36, and a vehicle speed sensor 37 in addition to a throttle sensor 31, a vehicle wheel speed sensor 32, and a brake pressure sensor 33.

The various sensors 21 detect various operation inputs of the rider J and various states of the motorcycle 1 and the occupant. The various sensors 21 output various detection information to the control device 23.

The throttle sensor 31 detects an operation amount (acceleration request) of an accelerator operator such as a throttle grip.

The brake pressure sensor 33 detects the operation force (deceleration request) of a brake operator.

The chassis acceleration sensor 34 is a 5-axis or 6-axis inertial measurement unit (IMU) and is configured to detect the angular velocity and acceleration of the three axes (roll axis, pitch axis, yaw axis) in the chassis and detect the angle from the result. Hereinafter, the chassis acceleration sensor 34 may be referred to as a chassis angular velocity sensor 34.

The steering angle sensor 35 is, for example, a potentiometer provided in the steering shaft (the steering shaft or the handle rotation shaft) and detects the rotation angle (steering angle) of the steering shaft with respect to the chassis.

The steering torque sensor 36 is, for example, a magnetostrictive torque sensor provided in the steering shaft of the fork member 3b (or the rotation shaft of the handle post 4a) and detects a torsion torque (steering input) input from the bar handle 4. The steering torque sensor 36 is an example of a load sensor that detects a steering force input to the bar handle 4 (steering operator).

In the front wheel suspension device 3 of the embodiment, the rotation shaft of the handle post 4a supporting the bar handle 4 and the steering shaft capable of steering the front wheel 2 are separate members, but the present invention is not limited thereto. For example, as in the general front wheel suspension device, the handle rotation shaft and the steering shaft (front wheel rotation shaft) may be the same as each other and the front wheel suspension device may be supported by the head pipe of the front-end portion of the chassis frame 5.

The various devices 22 include an engine controller 45, the brake actuator 42, a steering actuator 43, and a handle lock actuator 61.

The engine controller 45 includes a fuel injection device 46, an ignition device 47, and the throttle device 48. That is, the engine controller 45 includes an engine auxiliary device for driving the engine 10.

The brake actuator 42 supplies a hydraulic pressure to the front and rear brakes 2B and 12B in response to the operation of the brake operator to operate them. The brake actuator 42 also serves as a control unit of an anti-lock brake system (ABS).

The steering actuator 43 outputs a steering torque to a steering mechanism from the bar handle 4 to the fork member 3b. The steering actuator 43 operates an electric motor which is a drive source thereof in response to the detection information of the steering torque sensor 36 so that an assist torque is applied to the steering mechanism. The steering actuator 43 includes ST-ECU that electrically controls the operation of the electric motor.

Referring to FIG. 5, the steering actuator 43 is disposed on the left side of the handle support portion 6a and is attached to the chassis frame 5. The steering actuator 43 is disposed so that a drive shaft 43a of the electric motor is parallel to the handle rotation shaft. A swing arm 43b is attached to the drive shaft 43a to be rotatable together. The swing arm 43b is connected to an actuator connection portion 4a1 of the handle post 4a through a connecting rod 43c. Accordingly, a driving force (torque) of the electric motor can be transmitted to the handle post 4a, so that the steering of the front wheel 2 is assisted.

The handle lock actuator 61 constitutes part of a handle lock mechanism 60 to be described later and is operated by specified control to regulate the steering of the bar handle 4 and the front wheel suspension device 3.

<Steering Assist Control>

Referring to FIG. 1, the chassis acceleration sensor 34 is supported by the chassis (for example, the chassis frame 5) of the motorcycle 1. For example, the chassis acceleration sensor 34 is disposed in the vicinity of the line segment L connecting a ground contact point Gp of the rear wheel 12 and the substantially center portion of the head pipe 3a in the side view. The chassis acceleration sensor 34 detects the angular velocity Y in the yaw direction and the angular velocity R in the roll direction of the motorcycle 1. Hereinafter, the angular velocity Y in the yaw direction may be referred to as the yaw rate Y. Additionally, the chassis of the embodiment includes not only the chassis frame 5 but also a configuration that performs behaviors such as rolling, pitching, and yawing together with the chassis frame 5.

It has a characteristic that the bank (roll) of the chassis is generated after the steering (yaw) is generated by the operation of the bar handle 4 at the low speed of the motorcycle 1. That is, it is preferable to detect many yaw angular velocities Y since yaw is generated in advance when the motorcycle 1 has a low speed. On the other hand, it has a characteristic that the steering (yaw) is generated after the bank (roll) of the chassis is generated at the high speed of the motorcycle 1. That is, it is preferable to detect many roll angular velocities R since roll is generated in advance when the motorcycle 1 has a high speed. This characteristic is referred to as a steering characteristic of the motorcycle 1.

Figure 4:
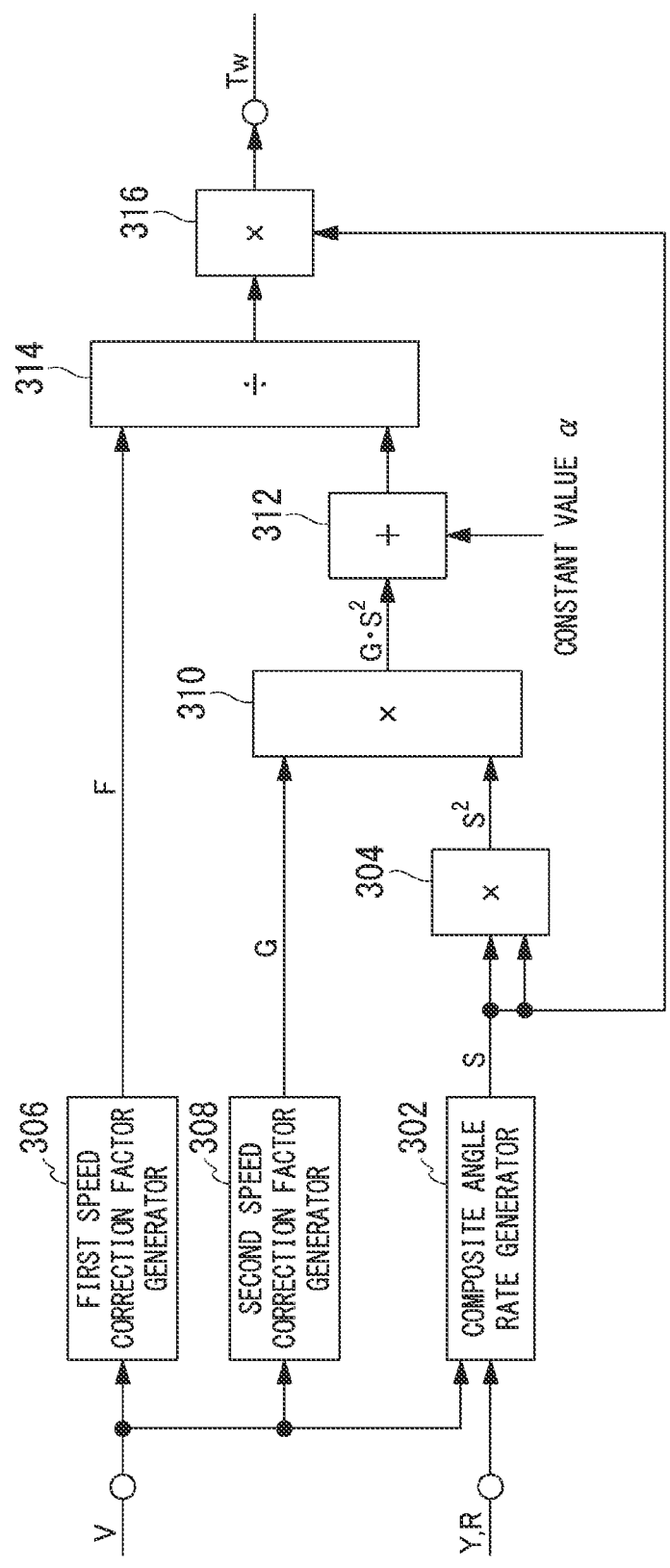
FIG. 4 is a configuration diagram of a wobble suppression assist torque calculation block of the steering assist device.

Referring to FIG. 4, the control device 23 combines the yaw angular velocity Y and the roll angular velocity R detected by the chassis acceleration sensor 34 to generate the combined angular velocity S. The control device 23 combines the yaw angular velocity Y and the roll angular velocity R detected by the chassis acceleration sensor 34 by changing the weights as follows according to the detected vehicle speed V. That is, from the steering characteristics of the motorcycle 1 described above, the angular velocities are combined by setting the weighting of the yaw angular velocity Y to be larger than the weighting of the roll angular velocity R when the vehicle speed V is low and the angular velocities are combined by setting the weighting of the roll angular velocity R to be larger than the weighting of the yaw angular velocity Y when the vehicle speed V is high.

For the generation of the combined angular velocity S, for example, as shown in the following formula (1), the combined angular velocity S may be generated by adding a value (Y×AD1) obtained by multiplying a first adjustment value AD1 by the yaw angular velocity Y and a value (R×AD2) obtained by multiplying a second adjustment value AD2 by the roll angular velocity R.

$$S = Y \times AD1 + R \times AD2 \quad (1)$$

In this case, the first adjustment value AD1 is set to be large at the low-speed side and small at the high-speed side and the second adjustment value AD2 is set to be small at the low-speed side and large at the high-speed side.

Figure 3:
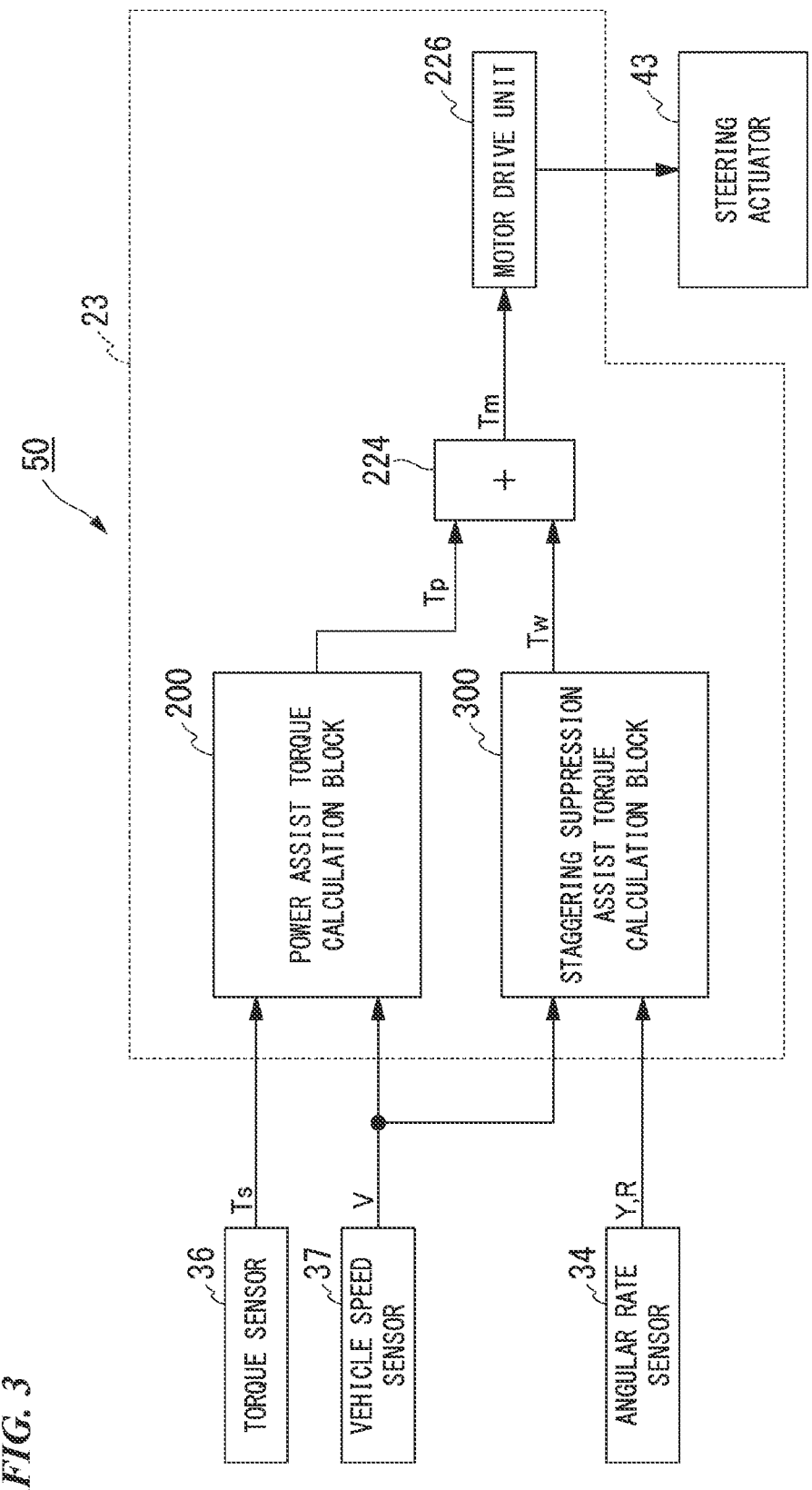
FIG. 3 is a configuration diagram of a steering assist device of the motorcycle.

FIG. 3 is a configuration diagram of the steering assist device 50.

The steering assist device 50 includes the steering torque sensor 36, the vehicle speed sensor 37, the chassis angular velocity sensor 34, the control device 23, and the steering actuator 43.

For example, the vehicle speed sensor 37 detects the rotation speed of the output shaft of the power unit U of the motorcycle 1 to detect the rotation speed of the rear wheel 12 and further the vehicle speed of the motorcycle 1 from the rotation speed of the output shaft. Additionally, the vehicle speed may be detected by obtaining vehicle wheel speed information from at least one of the ABS and the traction control system (TCS).

The control device 23 includes a power assist torque calculation block 200 and a wobble suppression assist torque calculation block 300. Each of the blocks 00 and 300 can be operated independently or can be operated as a whole.

The power assist torque calculation block 200 calculates the power assist torque Tp applied to the bar handle 4 based on the vehicle speed V and the steering torque Ts. The vehicle speed V is calculated from the detection information of the vehicle speed sensor 37, that is, the rotation speed of the drive wheel (rear wheel 12). The steering torque Ts corresponds to the input torque to the bar handle 4 by the driver and is calculated from the detection information of the steering torque sensor 36. The power assist torque Tp is a torque for reducing the driver's steering of the bar handle 4.

The wobble suppression assist torque calculation block 300 calculates the wobble suppression assist torque Tw applied to the bar handle 4 based on the vehicle speed V, the yaw angular velocity Y, and the roll angular velocity R. The yaw angular velocity Y and the roll angular velocity R are calculated from the detection information of the chassis angular velocity sensor 34. The wobble suppression assist torque Tw is a torque for suppressing the wobble of the motorcycle 1. For example, the wobble suppression assist torque Tw is applied in the direction of turning the bar handle 4 and the front wheel 2 to the left when the motorcycle 1 is inclined toward the left side. The wobble suppression assist torque Tw is applied in the direction of turning the bar handle 4 and the front wheel 2 to the right when the motorcycle 1 is inclined toward the right side.

The control device 23 includes an adding unit 224 and a motor drive unit 226.

The adding unit 224 generates an assist torque Tm by adding the power assist torque Tp and the wobble suppression assist torque Tw as shown in the following formula (2). The adding unit 224 outputs the generated assist torque Tm to the motor drive unit 226.

$$Tm=Tp+Tw \quad (2)$$

The motor drive unit 226 converts the assist torque Tm into a torque current and supplies the torque current to the electric motor of the steering actuator 43. The electric motor is driven while the torque current is supplied thereto to generate a driving force according to the torque current. The driving force of the electric motor is transmitted to the handle post 4a through the connecting rod 43c and the like and assists the rotation of the bar handle 4 and the front wheel 2. That is, the driving force (assisting force) according to the assist torque Tm is given to the bar handle 4 and the front wheel 2.

Referring to FIG. 4, the wobble suppression assist torque calculation block 300 includes a combined angular velocity generation unit 302, a multiplier 304, a first vehicle speed correction coefficient generation unit 306, a second vehicle speed correction coefficient generation unit 308, a multiplier 310, an adding unit 312, a divider 314, and a multiplier 316.

The combined angular velocity generation unit 302 combines the yaw angular velocity Y and the roll angular velocity R detected by the chassis angular velocity sensor 34 to generate the combined angular velocity (chassis behavior rate) S indicating the behavior of the motorcycle 1.

The multiplier 304 multiplies the combined angular velocity S and the combined angular velocity S to generate the square of the combined angular velocity S.

The first vehicle speed correction coefficient generation unit 306 generates a first vehicle speed correction coefficient F that suppresses wobbling based on the vehicle speed V.

The second vehicle speed correction coefficient generation unit 308 generates a second vehicle speed correction coefficient G that suppresses wobbling based on the vehicle speed V.

The multiplier 310 multiplies the second vehicle speed correction coefficient G by the square of the combined angular velocity S.

The adding unit 312 adds the value ($G \times S^2$) output by the multiplier 310 and the constant $\alpha$.

The divider 314 divides the first vehicle speed correction coefficient F by the value ($G \times S^2 + \alpha$) output by the adding unit 312.

The multiplier 316 multiplies the combined angular velocity S by the value ($F/(G \times S^2 + \alpha)$) output by the divider 314. That is, the multiplier 316 outputs the wobble suppression assist torque Tw expressed by the following formula (3).

$$Tw=F \times S/(G \times S^2 + \alpha) \quad (3)$$

When the motorcycle 1 wobbles (when an unintended inclination of the driver occurs), the combined angular velocity S becomes a relatively small value. When the motorcycle 1 is inclined due to the driver's weight transfer operation, the combined angular velocity S becomes a relatively large value. For these cases, the following effects can be obtained by calculating the wobble suppression assist torque Tw by the formula (3). That is, the wobble suppression assist torque Tw can be decreased when the combined angular velocity S is large. Thus, the wobble suppression assist torque Tw can be set not to interfere with the driver's weight transfer operation and the drivability can be improved.

As described above, the combined angular velocity generation unit 302 combines (adds) the angular velocities by increasing the weighting of the yaw angular velocity Y and decreasing the weighting of the roll angular velocity R on the low-speed side. Further, the combined angular velocity generation unit 302 combines (adds) the angular velocities by decreasing the weighting of the yaw angular velocity Y and increasing the weighting of the roll angular velocity R on the high-speed side. It is preferable to detect many yaw angular velocities Y at the low speed and many roll angular velocities R at the high speed in consideration of the steering characteristic of the motorcycle 1 in that the behavior of the motorcycle 1 is detected with high accuracy.

Then, when the behavior of the motorcycle 1 is large, the assist torque Tw is decreased by determining that this behavior is caused by the driver's weight operation. Then, when the behavior of the motorcycle 1 is small, the assist torque Tw is increased by determining that the behavior is caused by not the driver's weight operation but the wobble of the chassis or the like.

In this way, it is possible to perform wobbling suppression assist that does not give a sense of discomfort to the driver's operation regardless of whether the motorcycle 1 is at the low speed or high speed.

<Handle Lock System>

Figure 6:
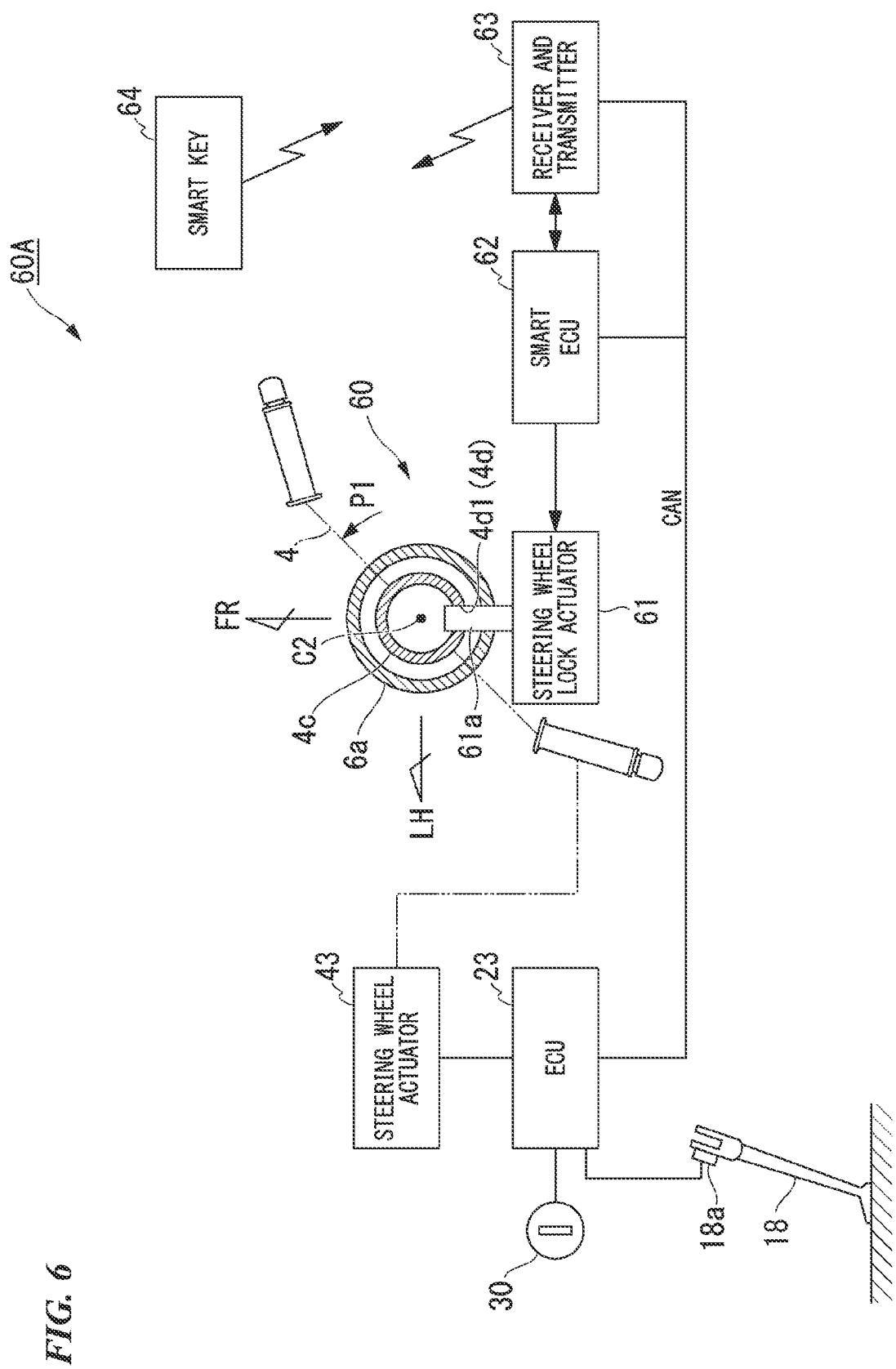
FIG. 6 is a configuration diagram showing a handle lock system of the motorcycle.

FIG. 6 is a configuration diagram of a handle lock system 60A of the motorcycle 1 of this embodiment.

The handle lock system 60A includes the handle lock mechanism 60, the steering actuator 43, and the control device 23.

The handle lock mechanism 60 locks the steering of the front wheel suspension device 3 (including the bar handle 4) with respect to the chassis frame 5 at the predetermined handle lock position P1. The handle lock position P1 of the embodiment is a full steering position of the front wheel suspension device 3 and the bar handle 4. The full steering position is a position in which the front wheel suspension device 3 and the bar handle 4 are substantially rotated to the left or right. The handle lock position P1 of the embodiment is the full steering position of the front wheel suspension device 3 and the bar handle 4 to the left (the side of the side stand 18) but may be a full steering position to the right.

The handle lock mechanism 60 includes the handle lock actuator 61 which is supported by the chassis frame 5 and a steering side engagement portion 4d which is provided in a member rotating together with the bar handle 4 in the front wheel suspension device 3.

The handle lock actuator 61 is supported and fixed to the handle support portion 6a of the chassis frame 5. The handle lock actuator 61 is, for example, an electric type operated by a solenoid and allows a lock pin 61a which is a chassis side engagement portion to appear and disappear with respect to the steering side engagement portion 4d.

The steering side engagement portion 4d is provided in, for example, a handle rotation shaft 4c inserted through the handle support portion 6a. The steering side engagement portion 4d includes an engagement hole 4d1 into and from which the lock pin 61a is inserted and removed. The lock pin 61a penetrates the rear portion of the handle support portion 6a and reaches the engagement hole 4d1. The handle rotation shaft 4c rotates together with the handle post 4a.

In such a configuration, the lock pin 61a is projected and inserted into the engagement hole 4d1, the rotation of the handle rotation shaft 4c with respect to the handle support portion 6a is regulated. Accordingly, the steering of the front wheel suspension device 3 and the bar handle 4 is regulated.

In FIG. 6, the handle lock actuator 61 is disposed behind the handle support portion 6a and allows the lock pin 61a to appear and disappear in the front and rear direction. The lock pin 61a is engaged with and detached from the handle rotation shaft 4c in the handle support portion 6a. However, the configuration of the handle lock mechanism 60 is not limited to the configuration of FIG. 6. For example, the handle lock actuator 61 may be disposed in front of the handle support portion 6a. The handle lock actuator 61 may allow the lock pin 61a to appear and disappear in the up and down direction. At this time, the lock pin 61a may engage with the steering side engagement portion provided in the top bridge portion of the handle post 4a.

The control device 23 steers the front wheel suspension device 3 and the bar handle 4 to the handle lock position P1 by operating the steering actuator 43 when detecting a specified lock standby state. An on/off signal from a main switch 30 which is a main power switch of the motorcycle 1 and an on/off signal from the stand switch 18a provided in the side stand 18 are input to the control device 23 in addition to various signals input from the sensors and devices shown in FIG. 2.

Here, the handle lock actuator 61 of the embodiment is included in a smart key system.

The smart key system includes a smart control unit (ECU) 62 which is mounted on the chassis of the motorcycle 1, a transceiver (antenna) 63 which is connected to the smart control unit 62, and a smart key (wireless device) 64 which is carried by the driver. The smart key 64 performs bidirectional communication with the smart control unit 62 via the transceiver 63 and performs ID authentication of the smart key 64. When the ID of the smart key 64 is authenticated, the engine can be started and each part of the vehicle can be unlocked.

For example, the on operation of the main switch 30 is enabled or validated by the ID authentication of the smart key 64 (unlocked state). When the communication between the smart key 64 and the smart control unit 62 is lost due to the smart key 64 moving away from the smart control unit 62 or the like, it becomes disabled or invalidated (locked state). Equipment that can be unlocked and locked by ID authentication of the smart key 64 includes, for example, equipment performing a handle lock, equipment opening and closing a seat, equipment opening and closing an article storage unit or a fuel filler port, and the like. When locking and unlocking various devices, the smart key system performs at least one of a visual sign such as blinking a hazard lamp and an auditory sign such as making an electronic sound (answerback).

The lock standby state includes a state in which a specified handle lock request operation is performed while the chassis of the motorcycle 1 is supported to stand in an upright posture inclined toward the left side by the side stand 18. The handle lock request operation includes a specified operation for at least one of the main switch 30 provided on the vehicle and the remote key separated from the vehicle. Examples of the specified operation include an overstroke or long press of the operator in the main switch 30 and the smart key 64 for a specified time or longer or a specified number of times or rules of multiple operations. By combining the stop state of the motorcycle 1 and the handle lock request operation, it is possible to prevent the unintended operation of the steering actuator 43.

Additionally, the lock standby state may be a state in which the chassis of the motorcycle 1 is supported to stand in an upright posture by the main stand 19. In this case, the handle lock position may be a full steering position to the right side of the front wheel suspension device 3.

Figure 7:
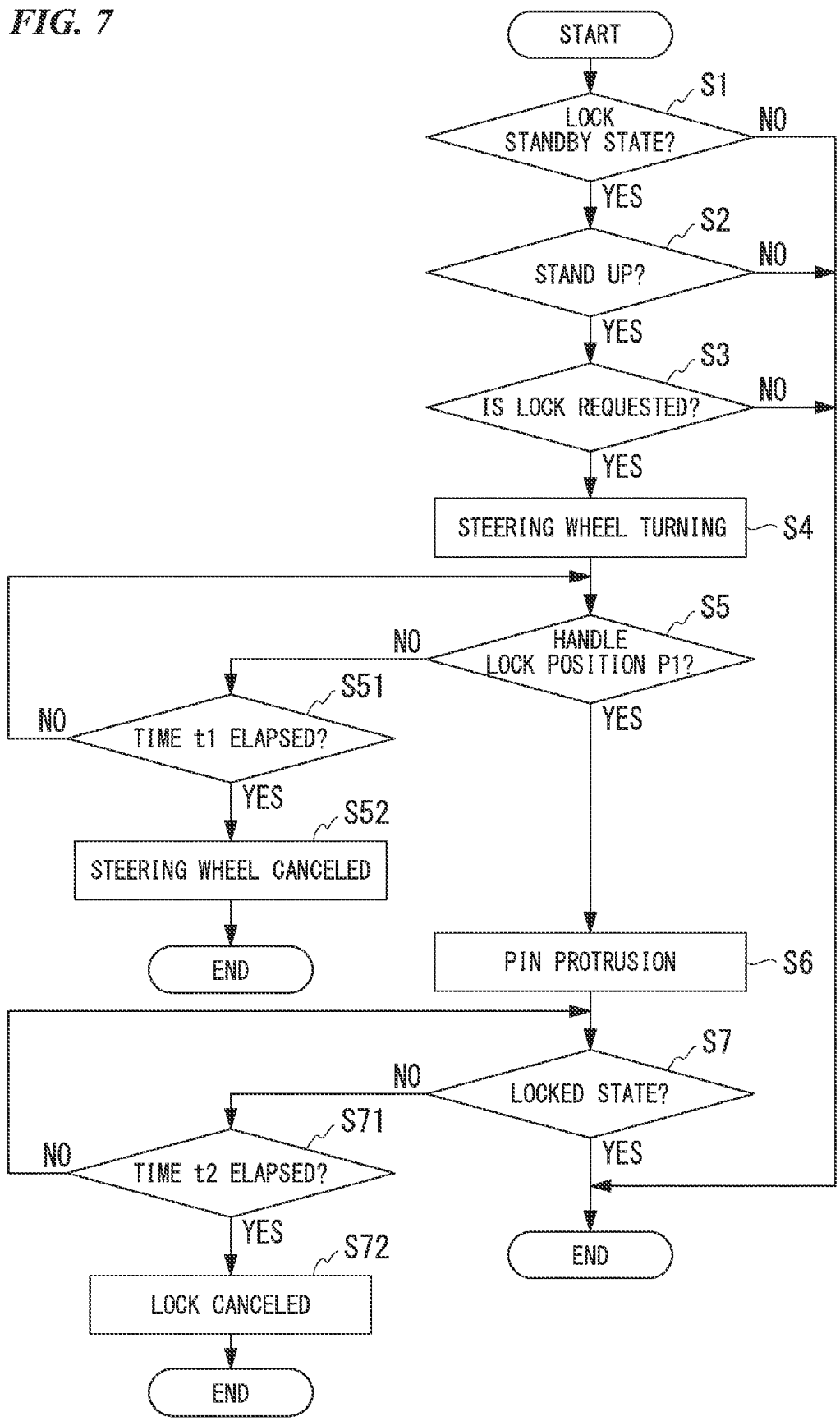
FIG. 7 is a flowchart showing a process during handle lock control of the handle lock system.

Next, a process during the handle lock control of the handle lock system 60A will be described with reference to the flowchart of FIG. 7.

First, it is determined whether or not the motorcycle 1 is in the lock standby state in step S1. When the motorcycle 1 is in the lock standby state (YES in step S1), it is determined whether or not the side stand 18 is in an upright state (step S2). When the side stand 18 is in an upright state (YES in step S2), it is determined whether or not the handle lock request operation is performed (step S3).

When the handle lock request operation is performed (YES in step S3), the steering actuator 43 is operated to start the steering of the front wheel suspension device 3 (step S4).

The determination in steps S1 to S3 is performed, for example, by the control device 23. When the determination result is NO in step S1 (the motorcycle 1 is not in the lock standby state), NO in step S2 (the side stand 18 is not in the upright state), and NO in step S3 (the handle lock request operation is not performed), the process is ended once.

Then, it is determined whether or not the front wheel suspension device 3 is turned to the full steering position (the handle lock position P1) on the side of the side stand 18 (step S5). When the front wheel suspension device 3 is turned to the full steering position (YES in step S5), the handle lock actuator 61 is operated so that the lock pin 61a is projected toward the steering side engagement portion 4d (step S6).

Then, it is determined whether or not the lock pin 61*a* is fully projected in the handle lock state (step S7). When the current state is the handle lock state (YES in step S7), the process of the handle lock control is ended.

The determination of steps S5 and S7 is performed, for example, in the control device 23 or the smart control unit 62. When the determination result is NO in step S5 (the front wheel suspension device 3 is not turned to the full steering position), it is determined whether or not a predetermined time t1 elapses from the start of the steering operation (step S51). When the time t1 elapses (YES in step S51), the steering operation is canceled (S52) and the process is ended. When the determination result is NO in step S51 (the time t1 does not elapse), the routine returns to step S5.

When the determination result is NO in step S7 (the handle is not locked), it is determined whether or not a predetermined time t2 elapses from the start of the projection of the lock pin 61*a* (step S71). When the time t2 elapses (YES in step S71), the handle lock operation (pin projecting operation) is canceled (S72) and the process is ended. When the determination result is NO in step S71 (the time t2 does not elapse), the routine returns to step S7.

As described above, the motorcycle 1 of the above-described embodiment is the saddle-riding vehicle including the front wheel suspension device 3 which supports the steering wheel (front wheel 2) and the steering handle (bar handle 4), the chassis frame 5 which supports the front wheel suspension device 3 to be steerable, the handle lock mechanism 60 which locks the steering of the front wheel suspension device 3 with respect to the chassis frame 5 at the predetermined handle lock position P1, the steering actuator 43 which applies the assist torque Tm to the front wheel suspension device 3, and the control device 23 which controls the driving of the steering actuator 43. The control device 23 operates the steering actuator 43 so that the front wheel suspension device 3 is turned to the handle lock position P1 when detecting a predetermined lock standby state.

According to this configuration, since the steering actuator 43 automatically steers the front wheel suspension device 3 to the handle lock position P1 when performing the handle lock of the motorcycle 1, the steering operation of the front wheel suspension device 3 is omitted. Therefore, the entire handle lock operation is simplified and convenience can be improved.

The motorcycle 1 includes the stands 18 and 19 which support the chassis in an upright state and the lock standby state is a state in which a predetermined handle lock request operation is performed while the chassis is supported by the stands 18 and 19.

According to this configuration, since the front wheel suspension device 3 is automatically turned to the handle lock position P1 while the chassis is supported in an upright state using the stands 18 and 19, the chassis is reliably supported by the stands 18 and 19 when the front wheel suspension device 3 is automatically turned. Therefore, convenience can be improved.

In the motorcycle 1, the handle lock request operation is a predetermined lock operation of at least one of the main switch 30 provided on the vehicle and the smart key 64 separated from the vehicle.

According to this configuration, since the front wheel suspension device 3 can be turned by at least one lock operation for the main switch 30 on the vehicle and the smart key 64 separated from the vehicle, convenience can be improved.

In the motorcycle 1, the stands 18 and 19 include the side stand 18 which supports the chassis in an upright posture inclined toward one of the left and right sides and the front wheel suspension device 3 is turned toward the side stand 18 to reach the handle lock position P1.

According to this configuration, since the front wheel suspension device 3 is turned toward the side stand 18 to reach the handle lock position P1, the chassis is not inclined toward the side stand 18 when the front wheel suspension device 3 is automatically turned. Therefore, it is possible to stabilize the inclined posture of the chassis even when the front wheel suspension device 3 is automatically turned toward the side stand 18.

In the motorcycle 1, the handle lock mechanism 60 includes the handle lock actuator 61 and the handle lock actuator 61 is operated to the lock state of automatically locking the steering of the front wheel suspension device 3 after the front wheel suspension device 3 is turned to the handle lock position P1. In other words, the control device 23 performs the handle lock control of operating the handle lock actuator 61 to a lock state of automatically locking the steering of the suspension device 3 after the suspension device 3 is turned to the handle lock position P1.

According to this configuration, since the steering of the front wheel suspension device 3 and the handle lock are automatically performed from the lock standby state, convenience can be further improved.

The motorcycle 1 (the control device 23 of the motorcycle 1) cancels the handle lock control when the front wheel suspension device 3 is not fully turned to the handle lock position P1 within the specified time t1 or the handle lock actuator 61 is not fully operated to the lock state within the specified time t2.

According to this configuration, the protection of the handle lock device and the periphery of the vehicle can be improved by canceling the handle lock control in consideration of a case of causing an event that hinders a series of operations from the steering of the front wheel suspension device 3 to the handle lock (for example, interference between an obstacle in the periphery of the vehicle and the suspension device) when the handle lock is not completed even after the specified time elapses.

Additionally, the present invention is not limited to the above-described embodiment. For example, the vehicle including the link type front wheel suspension device 3 has been exemplified, but the present invention is not limited thereto. For example, a vehicle including a known telescopic front fork in a front wheel suspension device may be used.

The present invention may be applied to a vehicle without a smart key system. Further, the present invention may be applied to a vehicle without a handle lock actuator. In this case, only the full steering of the suspension device may be automatically performed by the steering actuator.

The motorcycle is not limited to the vehicle in which the driver straddles the chassis, but also includes a scooter type vehicle with a step floor or a motorized bicycle. The present invention is not limited to the motorcycle and can be also applied to a saddle-riding vehicle in which front wheels and front wheel suspension devices are tilted and turned together with the chassis frame 5.

The saddle-riding vehicle includes all vehicles in which the driver straddles the chassis and rolls the chassis in a balanced manner. The saddle-riding vehicle includes not only the motorcycle but also a three-wheeled vehicle (including a front two-wheeled and rear one-wheeled vehicle in addition to a front one-wheeled and rear two-wheeled vehicle) or a four-wheeled vehicle. The saddle-riding vehicle also includes a scooter type vehicle with a step floor or a motorized bicycle. The saddle-riding vehicle also includes a vehicle that includes an electric motor in a prime mover.

Then, the configuration in the above-described embodiment is an example of the present invention, and various changes can be made without departing from the gist of the present invention, such as replacing the constituent elements of the embodiment with well-known constituent elements.

REFERENCE SIGNS LIST

1 Motorcycle (saddle-riding vehicle)
2 Front wheel (steering wheel)
3 Front wheel suspension device (suspension device)
5 Chassis frame
18 Side stand (stand)
19 Main stand (stand)
23 Control device (controller)
30 Main switch (switch)
43 Steering actuator
50 Steering assist device
60A Handle lock system
60 Handle lock mechanism
61 Handle lock actuator
64 Smart key (wireless device)
Tm Assist torque
P1 Handle lock position
t1, t2 Specified time

What is claimed is:

1. A saddle-riding vehicle comprising:
   a suspension device (3) which supports a steering wheel (2) and a steering handle (4);
   a chassis frame (5) which supports the suspension device (3) to be steerable;
   a handle lock mechanism (60) which locks the steering of the suspension device (3) with respect to the chassis frame (5) at a predetermined handle lock position (P1);
   a steering actuator (43) which applies an assist torque (Tm) to the suspension device (3); and
   a controller (23) for controlling the driving of the steering actuator (43),
   wherein the controller (23) performs handle lock control of operating the steering actuator (43) so that the suspension device (3) is turned to the handle lock position (P1) when detecting a predetermined lock standby state.

2. The saddle-riding vehicle according to claim 1, further comprising:
   stands (18, 19) which support the chassis in an upright state,
   wherein the lock standby state is a state in which a predetermined handle lock request operation is performed while the chassis is supported by the stands (18, 19).

3. The saddle-riding vehicle according to claim 2,
   wherein the handle lock request operation is a predetermined lock operation for at least one of a switch (30) provided on the vehicle and a wireless device (64) separated from the vehicle.

4. The saddle-riding vehicle according to claim 2,
   wherein the stands (18, 19) includes a side stand (18) which supports the chassis in an upright state inclined toward one of the left and right sides, and
   wherein the suspension device (3) is turned to the side stand (18) to reach the handle lock position (P1).

5. The saddle-riding vehicle according to claim 1,
   wherein the handle lock mechanism (60) includes a handle lock actuator (61), and
   the controller (23) performs the handle lock control of operating the handle lock actuator (61) to a lock state of automatically locking the steering of the suspension device (3) after the suspension device (3) is turned to the handle lock position (P1).

6. The saddle-riding vehicle according to claim 5,
   wherein the controller (23) cancels the handle lock control when the suspension device (3) is not fully turned to the handle lock position (P1) within a specified time (t1) or the handle lock actuator (61) is not fully operated to the lock state within a specified time (t2).

* * * * *